United States Patent
Kim et al.

(10) Patent No.: US 7,689,895 B2
(45) Date of Patent: Mar. 30, 2010

(54) ON-THE FLY ERROR CHECKING AND CORRECTION CODEC SYSTEM AND METHOD FOR SUPPORTING NON-VOLATILE MEMORY

(75) Inventors: Dae-woong Kim, Seoul (KR); Hyun-woong Lee, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 967 days.

(21) Appl. No.: 11/438,262

(22) Filed: May 23, 2006

(65) Prior Publication Data

US 2006/0282757 A1    Dec. 14, 2006

(30) Foreign Application Priority Data

May 24, 2005    (KR) .................... 10-2005-0043811

(51) Int. Cl.
*H03M 13/00*    (2006.01)
(52) U.S. Cl. ............... 714/785; 714/801; 714/758; 711/104
(58) Field of Classification Search .......... 714/785, 714/801, 758; 711/104
See application file for complete search history.

(56) References Cited

U.S. PATENT DOCUMENTS

| | | | |
|---|---|---|---|
| 5,793,774 A | 8/1998 | Usui et al. | |
| 6,351,412 B1 | 2/2002 | Nozoe et al. | |
| 6,526,477 B1* | 2/2003 | Yuan et al. | 711/114 |
| 6,683,817 B2 | 1/2004 | Wei et al. | |
| 2002/0161970 A1* | 10/2002 | Busser | 711/114 |
| 2004/0205418 A1 | 10/2004 | Sakaue et al. | |
| 2004/0255225 A1 | 12/2004 | Takai | |

FOREIGN PATENT DOCUMENTS

| | | |
|---|---|---|
| JP | 2004-126911 | 4/2004 |
| JP | 2004-234545 | 8/2004 |
| KR | 10-1994-0017260 | 7/1994 |
| KR | 10-2004-0044103 | 5/2004 |

* cited by examiner

*Primary Examiner*—M. Mujtaba K Chaudry
*Assistant Examiner*—Enam Ahmed
(74) *Attorney, Agent, or Firm*—Lee & Morse, P.C.

(57) ABSTRACT

An on-the-fly error checking and correcting system and method of supporting a non-volatile memory processes data using an on-the-fly error correction method to be performed between a temporary memory and a flash memory. The flash memory stores actual data read from the temporary memory and parity generated on-the-fly in a write mode, and transmits the stored data to the temporary memory, computes a syndrome from the stored data on-the-fly, and generates an error correction information signal according to the result of computing in a read mode. Thus, error correction may only be selectively performed.

20 Claims, 5 Drawing Sheets

ON-THE FLY ERROR CHECKING AND CORRECTION CODEC SYSTEM AND METHOD FOR SUPPORTING NON-VOLATILE MEMORY

BACKGROUND OF THE INVENTION

1. Field of the Invention

The present invention relates to an encoding and decoding (hereinafter referred to as "CODEC") system. More particularly, the present invention relates to a CODEC system and method for performing on-the-fly error checking and correcting (ECC) to support a non-volatile memory.

2. Description of the Related Art

FIG. 1 illustrates a block diagram of a conventional CODEC system 10. The CODEC system 10 includes an error correction unit 11, a temporary memory 12, e.g., a static random access memory (SRAM), and a non-volatile memory 13, e.g., a flash memory.

FIG. 2 illustrates an encoding process of accessing the flash memory 13 to write input data thereon in the CODEC system 10 of FIG. 1. Referring to FIG. 2, when the temporary memory 12 stores the input data, the error correction unit 11 accesses the temporary memory 12 to read the stored data (S21). Next, the error correction unit 11 generates parity from the read data (S22) and accesses the temporary memory 12 to store the parity therein (S23). Next, the flash memory 13 reads the input data and the parity from the temporary memory 12, and stores them as non-volatile data (S24).

FIG. 3 illustrates a decoding process of accessing the flash memory 13 and reading the non-volatile data from the flash memory 13 in the CODEC system 10 of FIG. 1. Referring to FIG. 3, the temporary memory 12 reads and stores data and corresponding parity from the flash memory 13 (S31). Next, the error correction unit 11 accesses the temporary memory 12 to read the stored data (S32). Thereafter, the error correction unit 11 corrects an error in the data using the parity (S33), and accesses the temporary memory 12 and stores the corrected data as output data in the temporary memory 12 (S34).

The output data stored in the temporary memory 12 may be transmitted to and processed by a processor (not shown), and output as multimedia data to be provided to users.

If the CODEC system 10 is an MP3 player, the flash memory 13 may be a multi-level cell (MLC) type flash memory. In this case, it is known that an error may occur in a maximum of four symbols among 512 byte memory cells corresponding to one page. Here, a symbol may be 9 bits. The encoding and decoding processes illustrated in FIGS. 2 and 3 are required to correct the error. When the CODEC system 10 encodes one page, the error correction unit 11 requires 512-byte read access and 9-byte write access to store 9-byte parity in the temporary memory 12. When the CODEC system 10 decodes one page, the error correction unit 11 requires at least 521-byte read access to read 512-byte data and 9-byte parity from the temporary memory 12.

However, conventionally, even if there is no error in the data, read/write access to the temporary memory 12 to generate parity in the encoding process, and read access to the temporary memory 12 to correct the error in the decoding process are performed unnecessarily. This increases power consumption and degrades system performance.

SUMMARY OF THE INVENTION

The present invention is therefore directed to a CODEC system and method, which substantially overcome one or more of the problems due to the limitations and disadvantages of the related art.

It is therefore a feature of an embodiment of the present invention to provide a system for supporting a non-volatile memory by computing parity and a syndrome on-the-fly to reduce unnecessary operation cycles and power consumption.

It is another feature of an embodiment of the present invention to provide only selective error correction in accordance with a computed syndrome.

It is yet another feature of an embodiment of the present invention to provide an encoding method and a decoding method of correcting an error on-the-fly to support a non-volatile memory.

At least one of the above and other features and advantages of the present invention may be realized by providing a system for processing input data and output data including a first memory temporarily storing the input data and the output data, and a second memory receiving the input data from the first memory and generating parity on-the-fly in a write mode, and computing a syndrome on-the-fly, generating an error correction information signal in accordance with the syndrome and transmitting the output data to the first memory in a read mode.

The second memory may operate in the write mode in which the input data and the parity generated from the input data are stored as write data, and the read mode in which actual data from the write data excluding the parity is transmitted as the output data.

The system may include an error correction unit selectively correcting and storing the output data stored in the first memory in response to the error correction information signal. The error correction unit may correct the output data by performing a computing operation when a value of the syndrome indicates an error in the output data and replaces the output data with the corrected data. The system may include a memory interface unit connected between the error correction unit and the first memory so as to control access to the first memory.

The second memory may include a flash cell array having a plurality of memory cells, each storing the input data and the parity generated from the input data and a flash memory controller connected between the flash cell array and the first memory for controlling receiving of data from and outputting of data to the first memory, and for computing the parity and the syndrome.

The system may include a first bus, a memory interface unit connected between the first memory and the first bus and controlling access to the first memory, a second bus connected to the second memory and a bridge interface unit connected between the first and second buses. The system may include a direct memory access unit receiving a request for access to the first memory from the second memory and generating a signal in response to the request. The syndrome may be computed using the Reed Solomon algorithm.

At least one of the above and other features and advantages of the present invention may also be realized by providing method of processing input data and output data, including temporarily storing the input data in a first memory, transmitting the input data from the first memory to a second memory and generating parity on-the-fly, computing a syndrome on-the-fly, generating an error correction information signal according to the result of computing, and generating the error correction information signal when transmitting the output data from the second memory to the first memory, and temporarily storing the output data in the first memory.

At least one of the above and other features and advantages of the present invention may further be realized by providing an article of manufacture having a machine-accessible medium including data that, when accessed by a machine, causes the machine to temporarily store the input data in a first memory, transmit the input data from the first memory to a second memory and generating parity on-the-fly, compute a syndrome on-the-fly, generate an error correction information signal according to the syndrome, and generate the error correction information signal when transmitting the output data from the second memory to the first memory, and temporarily store the output data in the first memory.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
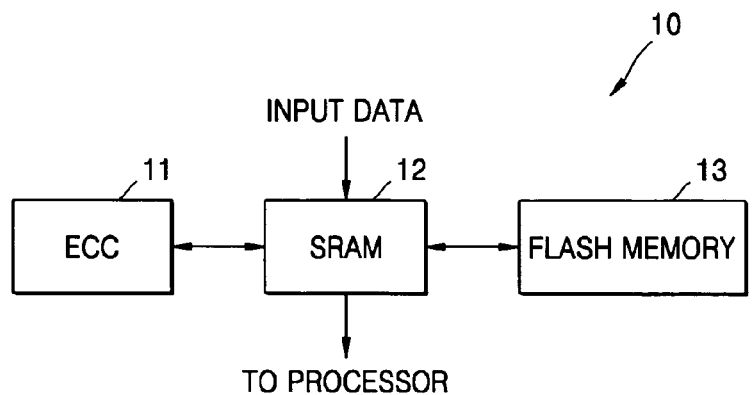
FIG. 1 illustrates a block diagram of a conventional CODEC system.
Figure 2:
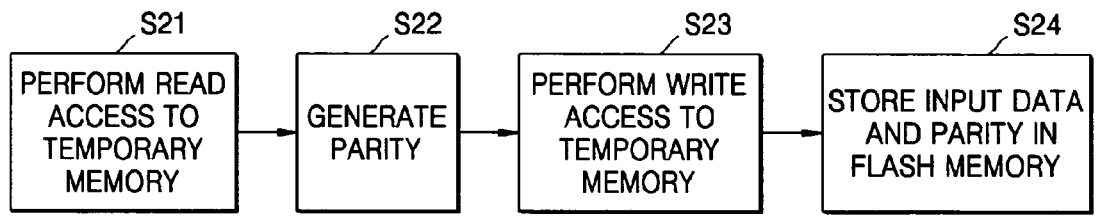
FIG. 2 illustrates an encoding process of accessing a flash memory to write input data thereon in the CODEC system of FIG. 1.
Figure 3:
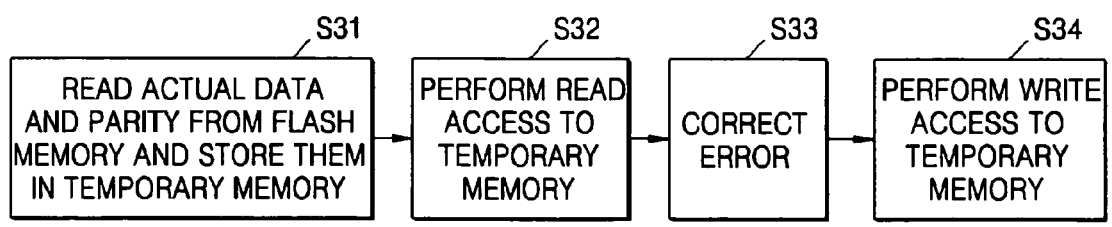
FIG. 3 illustrates a decoding process of accessing a flash memory to read data from the flash memory in the CODEC system of FIG. 1.

Korean Patent Application No. 10-2005-0043811, filed on May 24, 2005, in the Korean Intellectual Property Office, and entitled: "On-the Fly Error Checking and Correction CODEC System and Method for Supporting Non-Volatile Memory," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 4:
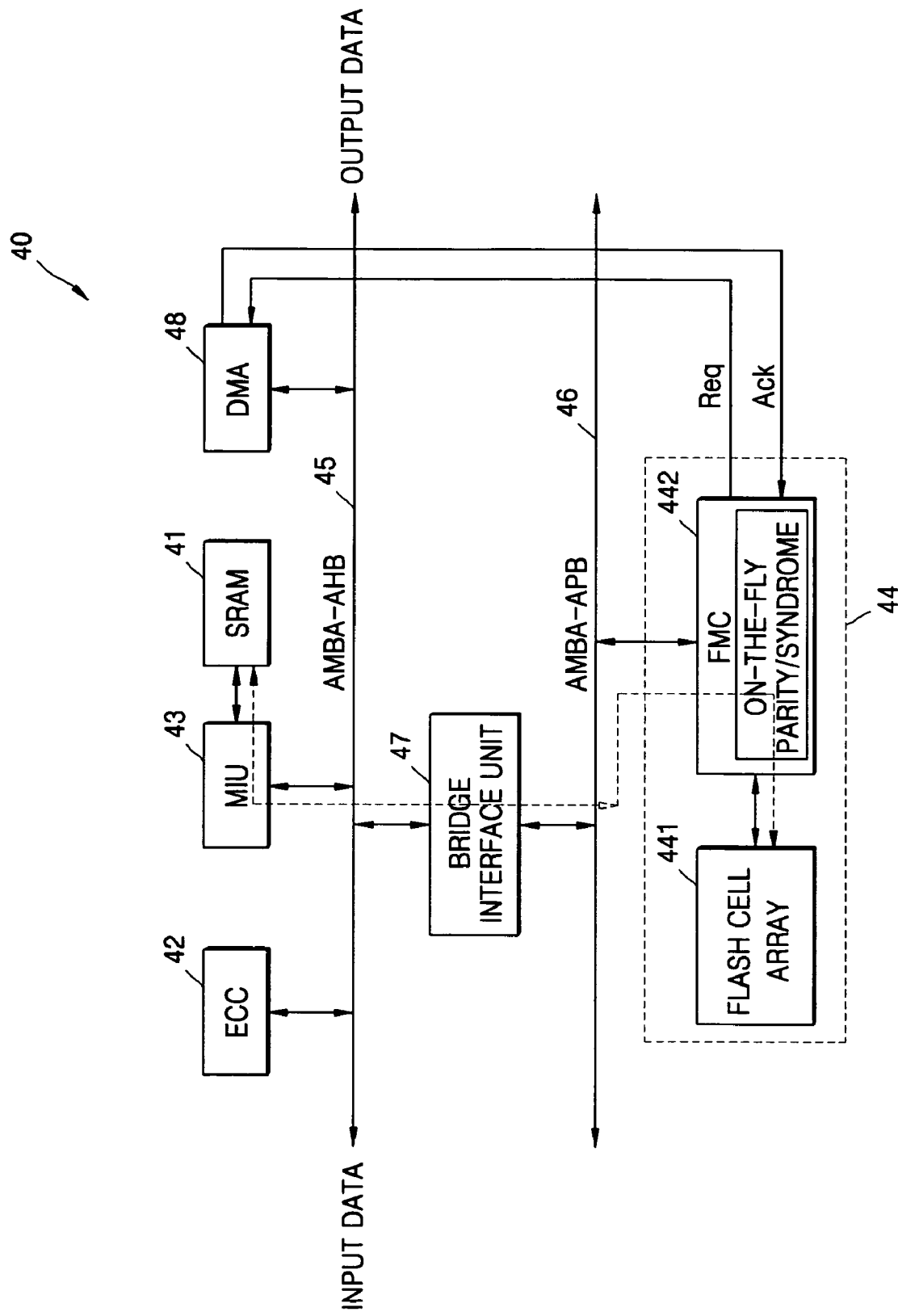
FIG. 4 illustrates a block diagram of a data processing system according to an embodiment of the present invention.

FIG. 4 illustrates a block diagram of a data processing system 40 according to an embodiment of the present invention. The data processing system 40 may include a temporary memory 41, e.g., a static random access memory (SRAM), and a non-volatile memory 44, e.g., a flash memory. The data processing system 40 may include an error checking and correction (ECC) unit 42, a memory interface unit (MIU) 43, an advanced micro-controller bus architecture-advanced high-performance bus (AMBA-AHB) 45, an AMBA-advanced peripheral bus (APB) 46, a bridge interface unit 47 and a direct memory access (DMA) unit 48.

The data processing system 40 may be applicable to a CODEC system, e.g., an MP3 player or a portable multimedia player (PMP). The data processing system 40 may be designed to perform an ECC operation on-the-fly during an encoding/decoding process.

The temporary memory 41 may temporarily store external input data and output data received from the non-volatile memory 44 under control of the MIU 43. The input data stored in the temporary memory 41 may be a multimedia file, e.g., a music file or a video file, transmitted from a host computer (not shown) via a universal serial bus (USB) port (not shown). As will later be described, the input data stored in the temporary memory 41 may be written to the non-volatile memory 44 on-the-fly and the data written to the non-volatile memory 44 may be read as output data by the temporary memory 41 on-the-fly.

The non-volatile memory 44 may include a flash cell array 441 and a flash memory controller 442. Under control of the flash memory controller 442, the flash cell array 441 may store the input data received from the temporary memory 41 in a write mode and may output the stored data in a read mode. Under control of the DMA unit 48, the flash memory controller 442, connected between the flash cell array 441 and the temporary memory 41, may control the write mode in which data is received from the temporary memory 41 and the read mode in which data is transmitted to the temporary memory 41. In the write/read mode, the DMA unit 48 may receive a write/read access request Req from the flash memory controller 442 and may transmit a signal Ack, indicating whether a write/read access is permitted, to the flash memory controller 442 in response to the write/read access request Req.

In the write mode, to allow input/output data to be processed using an on-the-fly error correction method, the flash memory controller 442 generates parity from the received input data on-the-fly, independent of the ECC unit 42. The flash cell array 441 stores the received input data together with the generated parity as write data.

In the read mode, and also independent of the ECC unit 42, the flash memory controller 442 may compute a syndrome on-the-fly based on the write data containing the parity received from the flash cell array 441 and may generate an error correction information signal in accordance with a value of the syndrome, which depends only on the error pattern. The flash memory controller 442 may output the actual data excluding the parity from the write data containing the parity received from the flash cell array 441 and transmit the actual data as output data to the temporary memory 41.

The temporary memory 41 may operate according to the result of arbitration regarding use of the AMBA-AHB 45, determined by the MIU 43. In other words, the MIU 43 connected between the AMBA-AHB 45 and the temporary memory 41 may control access of the temporary memory 41 to the AMBA-AHB 45. The AMBA-APB 46 may be connected to the flash memory controller 442 of the non-volatile memory 44. The bridge interface unit 47 may be an interface connected between the AMBA-AHB 45 and the AMBA-APB 46.

In response to the error correction information signal generated by the flash memory controller 442 in a read mode of the non-volatile memory 44, the ECC unit 42 may either correct and store the output data in the temporary memory 41 or does not correct the output data. For instance, when the error correction information signal indicates that the output data received from the flash cell array 441 contains an error, the ECC unit 42 may correct the data by performing a computing process subsequent to computation of the syndrome according to the Reed Solomon algorithm. Then, the ECC unit 42 may substitute the corrected data for the output data containing the error stored in the temporary memory 41. Arbitration by the MIU 43 that controls access to the temporary memory 41 may also be required to write the corrected data to the temporary memory 41.

As described above, according to the present invention, operation of the ECC unit 42 is not required in the write mode of the non-volatile memory 44, thereby saving an operation cycle of read/write access to the temporary memory 41. In the read mode of the non-volatile memory 44, write access to the temporary memory 41 is required once to allow the ECC unit 42 to store the corrected data in the temporary memory 41. However, when the error correction information signal indicates that the output data received from the flash cell array 441 does not contain an error, neither read nor write accesses to the temporary memory 41 is required, thereby saving an operation cycle therefore.

The output data stored in the temporary memory 41 may be transmitted to and decoded by a subsequent processor (not shown), and output, e.g., as multimedia data that provides a user with audio and video information.

Operation of the data processing system 40 according to an embodiment of the present invention will now be described in greater detail with reference to FIGS. 4 and 7.

Figure 5:
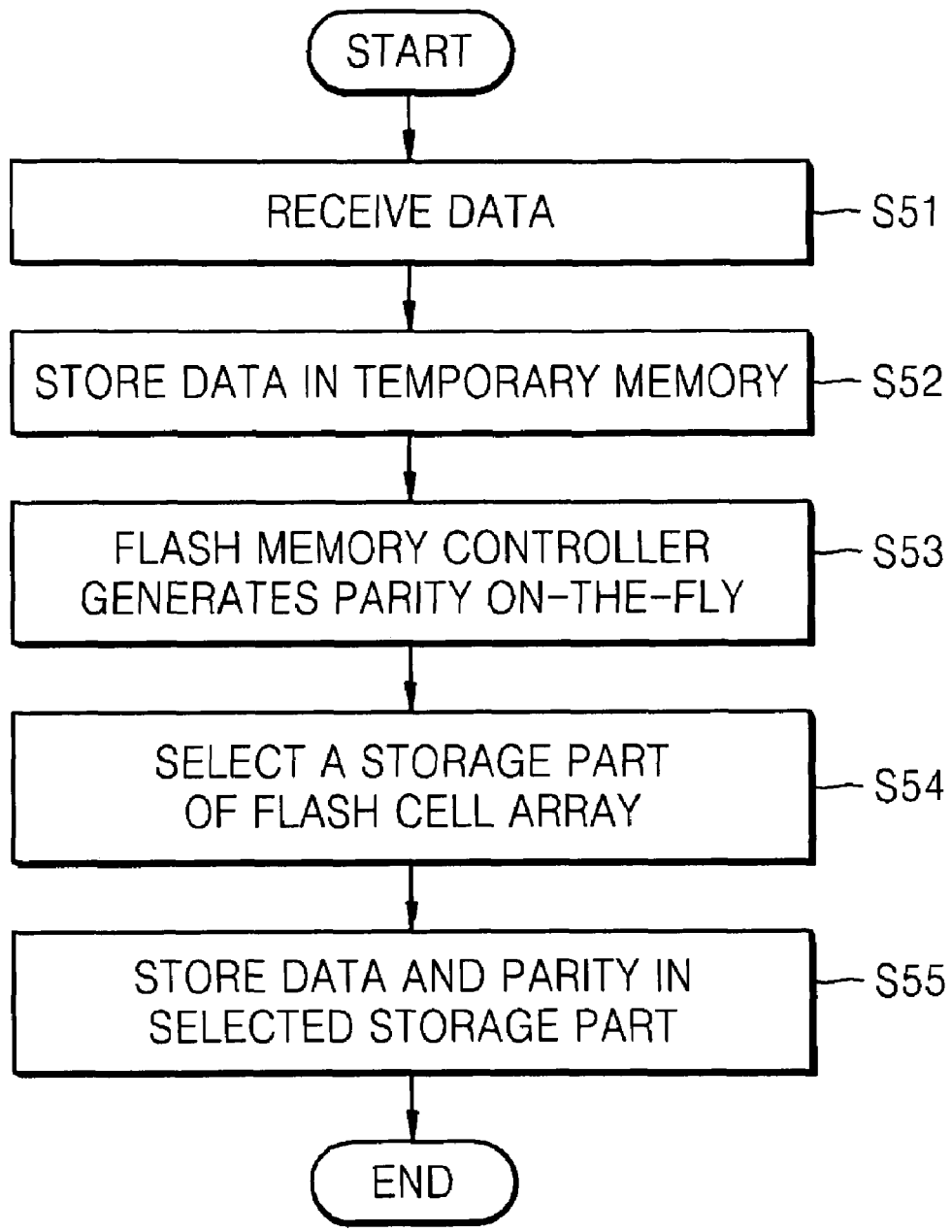
FIG. 5 illustrates a flowchart of a method of performing write access to a non-volatile memory according to an embodiment of the present invention.

FIG. 5 illustrates a flowchart of a method of performing write access to the non-volatile memory 44 of FIG. 4 according to an embodiment of the present invention. Referring to FIGS. 4 and 5, the temporary memory 41 may receive input data from an external source, e.g., a USB port (not shown) connected to a host computer (not shown), via the AMBA-AHB 45 (S51). The temporary memory 41 may temporarily store the input data until it is written to the non-volatile memory 44 (S52). Next, the flash memory controller 442 may receive an acknowledge from the DMA unit 48 and may access the MIU 43 via the AMBA-APB 46, the bridge interface unit 47 and the AMBA-AHB 45 to receive the input data stored in the temporary memory 41. Next, independent of the ECC unit 42, the flash memory controller 442 may generate parity from the received input data on-the-fly (S53). The flash memory controller 442 may include a unit (not shown) that generates the parity to be used for error correction, e.g., using the Reed Solomon algorithm.

Figure 6:
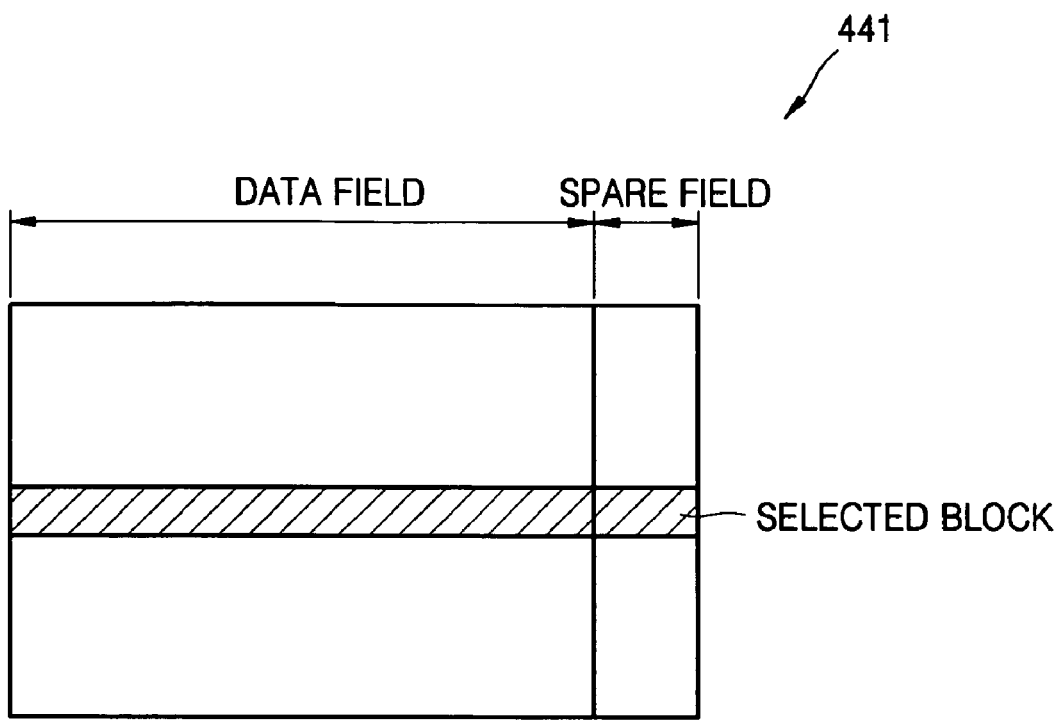
FIG. 6 illustrates the structure of a general flash memory.

After generating the parity, the flash memory controller 442 may select a storage part of the flash cell array 441 to store as write data the received input data together with the parity (S54). The structure of the flash cell array 441 that includes a NAND type memory cell, as illustrated in FIG. 6, may be used. Referring to FIG. 6, the flash cell array 441 may include a spare field that stores the parity and a data field that stores the actual data, excluding the parity, which is to be actually reproduced. The flash memory controller 442 may select a block of the flash cell array 441 and may store as write data the parity and the received data in the selected block (S55). The received data and the parity may be sequentially stored in the data field and the spare field, respectively, and vice versa.

As described above, according to the present invention, the ECC unit 42 does not need read access to the temporary memory 41 to read the input data so as to generate the parity or write access to the temporary memory 41 to store the parity in an encoding process in the write mode of the non-volatile memory 44. Accordingly, it is possible to save an operation cycle spent performing read access and write access to the temporary memory 41. For example, in a NAND flash structure in which an error may occur in a maximum of four symbols among 512 byte memory cells corresponding to one page, it is possible to save operation cycles to perform 512-byte read access of input data and 9-byte write access of parity.

Figure 7:
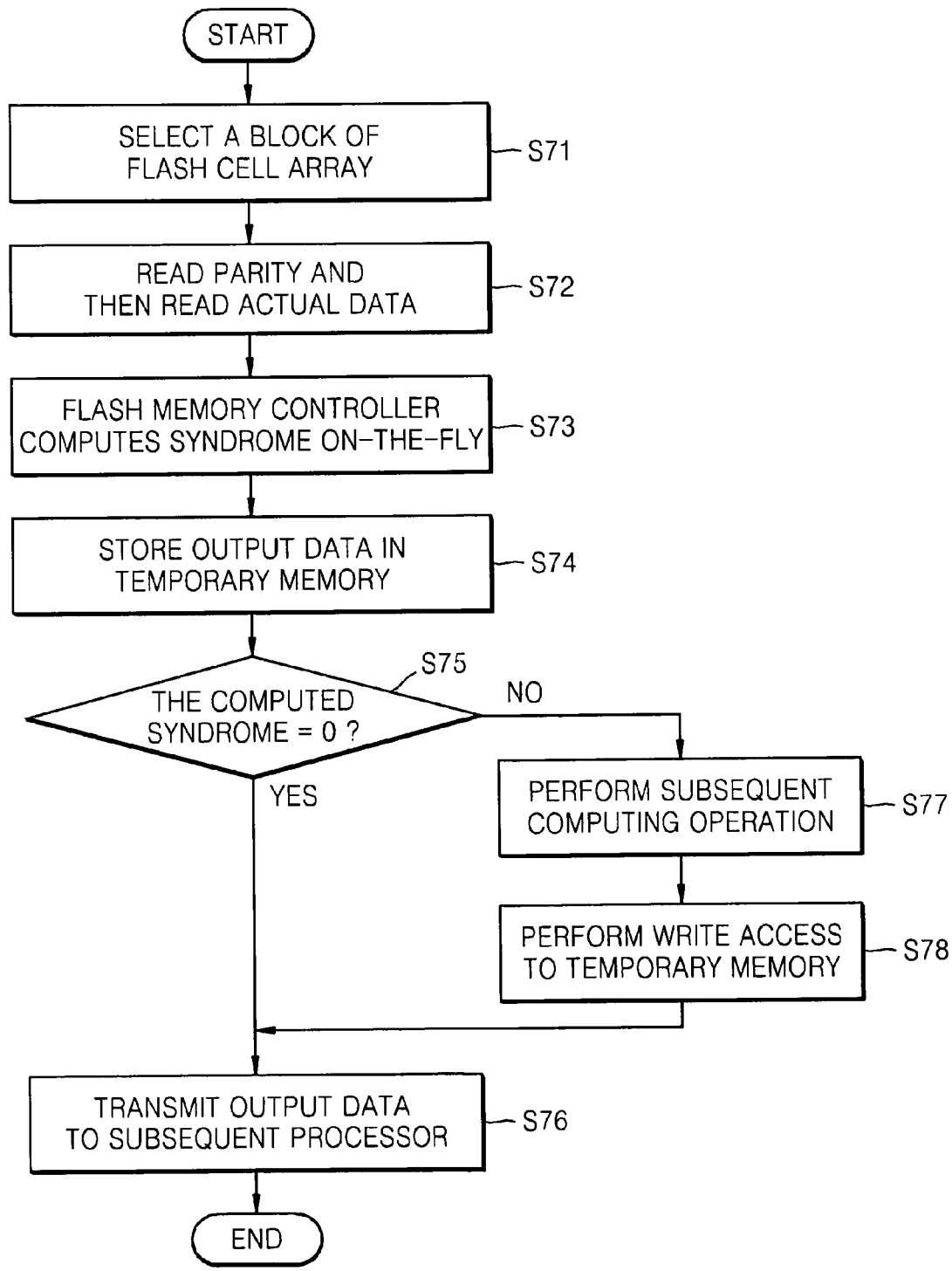
FIG. 7 illustrates a flowchart of a method of performing read access to a non-volatile memory according to an embodiment of the present invention.

FIG. 7 illustrates a flowchart of a method of performing read access to the non-volatile memory 44 of FIG. 4 according to an embodiment of the present invention. Referring to FIG. 7, the flash memory controller 442 may select a block of the flash cell array 441, such as that illustrated in FIG. 6 (S71). The flash memory controller 442 may read write data from the selected block (S72). Specifically, parity of the write data may be read from a spare field of the selected block, and then, actual data, which is the remaining part of the write data, may be read from a data field of the selected block. Of course, the opposite order is possible, but it is preferable that the parity is read first for fast computation of a syndrome, since the length of the spare field is less than that of the data field.

When the data is read from the flash cell array 441, the flash memory controller 442 may compute a syndrome on-the-fly based on the write data containing the parity, irrespective of the ECC unit 42, and generate an error correction information signal according to the syndrome (S73). The syndrome may be computed according to the Reed Solomon algorithm. The flash memory controller 442 may include a unit (not shown) that computes the syndrome for error correction according to the Reed Solomon algorithm. During the computation of the syndrome, the flash memory controller 442 may receive an acknowledge signal from the DMA unit 48 and may transmit the actual data of the write data, excluding the parity, as output data to the temporary memory 41 via the AMBA-APB 46, the bridge interface unit 47 and the AMBA-AHB 45. Then, the temporary memory 41 may receive and store the output data from the flash memory controller 442, arbitrated by the MIU 43 (S74).

The error correction information signal generated according to the computed syndrome may be stored as a register value in a predetermined register (not shown). The register value may be transmitted to the ECC unit 42 by a central processing unit (CPU) (not shown). The ECC unit 42 may detect the value of the computed syndrome from the error correction information signal (S75). For instance, the error correction information signal may be at a logic low level when the computed syndrome is zero, and is at a logic high level otherwise.

According to the Reed Solomon algorithm, when the computed syndrome is zero, the output data received from the flash cell array 441 is not considered to contain an error. In this case, the ECC unit 42 does not need to correct the output data. The output data stored in the temporary memory 41 may be transmitted to and decoded by a processor (not shown) without being corrected, and output as multimedia data that provides a user with audio and video information (S76).

According to the Reed Solomon algorithm, if the computed syndrome is not zero, the output data received from the flash cell array 441 is considered to contain an error. Thus, the ECC unit 42 performs a computing operation subsequent to the computation of the syndrome so as to correct the error (S77). For instance, the subsequent computing operation may be a modified Euclid's algorithm, a Chien search, and error correction. Next, the output data containing the error stored in the temporary memory 41 is replaced with the corrected data by accessing the temporary memory 41 (S78).

According to the present invention, if the output data contains an error in a decoding process in the read mode of the non-volatile memory 44, the ECC unit 42 requires write access to the temporary memory 41 only once to replace the output data with the corrected data. However, if the output data does not contain an error, the ECC unit 42 does not operate and thus does not require either read access or write access to the temporary memory 41. Accordingly, in a NAND flash structure, the ECC unit 42 does not need to perform an operation cycle in which 512-byte access and 9-byte access are performed to read the output data and the parity for computation of a syndrome, respectively.

The corrected data stored in the temporary memory 41 may be transmitted to and decoded by the processor (S76). The processed data may be output, e.g., as multimedia data that provides a user with audio and video information.

As described above, the data processing system 40 according to the present invention processes data using the on-the-fly error correction method to be performed between the temporary memory 41 and the non-volatile memory 44. The non-volatile memory 44 stores actual data read from the temporary memory 41 and parity generated on-the-fly in a write mode. Also, the non-volatile memory 44 transmits the stored data to the temporary memory 41, computes a syndrome on-the-fly based on the stored data, and generates an error correction information signal according to the result of computing in a read mode.

Accordingly, a data processing system according to the present invention processes input and output data according to the on-the-fly error correction method, thereby improving system performance while reducing unnecessary operation cycles and power consumption.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of present may be implemented in software, e.g., by an article of manufacture having a machine-accessible medium including data that, when accessed by a machine, cause the machine to compute a syndrome on-the-fly in accordance with methods of the present invention. Accordingly, it will be understood by those of ordinary skill in the art that various changes in form and details may be made without departing from the spirit and scope of the present invention as set forth in the following claims.

What is claimed is:

1. A system for processing input data and output data, comprising:
   a first memory for temporarily storing the input data and the output data; and
   a second memory for receiving the input data from the first memory, and generating and storing parity on-the-fly in a write mode during which the input data is stored in the second memory, and computing a syndrome on-the-fly from the parity stored in the second memory, generating an error correction information signal in accordance with the syndrome, and transmitting the output data to the first memory in a read mode during which data is read from the second memory.

2. The system as claimed in claim 1, wherein:
   when the second memory operates in the write mode, the input data and the parity generated from the input data are stored as write data in the second memory; and
   when the second memory operates in the read mode, actual data from the write data, excluding the parity, is transmitted as the output data from the second memory.

3. The system as claimed in claim 1, further comprising an error correction unit for selectively correcting and storing the output data stored in the first memory in response to the error correction information signal.

4. The system as claimed in claim 3, wherein the error correction unit corrects the output data by performing a computing operation when a value of the syndrome indicates an error in the output data, and replaces the output data with corrected data.

5. The system as claimed in claim 4, further comprising a memory interface unit connected between the error correction unit and the first memory so as to control access to the first memory.

6. The system as claimed in claim 1, wherein the second memory comprises:
   a flash cell array having a plurality of memory cells storing the input data and the parity generated from the input data; and
   a flash memory controller connected between the flash cell array and the first memory for controlling receiving of data from and outputting of data to the first memory, and for computing the parity and the syndrome.

7. The system as claimed in claim 1, further comprising:
   a first bus;
   a memory interface unit connected between the first memory and the first bus and controlling access to the first memory;
   a second bus connected to the second memory; and
   a bridge interface unit connected between the first and second buses.

8. The system as claimed in claim 1, further comprising a direct memory access unit for receiving a request for access to the first memory from the second memory and for generating a signal in response to the request.

9. The system as claimed in claim 1, wherein the syndrome is computed using the Reed Solomon algorithm.

10. A method of processing input data and output data, comprising:
    temporarily storing the input data in a first memory;
    transmitting the input data from the first memory to a second memory;
    generating parity on-the-fly in the second memory;
    storing the parity in the second memory;
    computing a syndrome on-the-fly based on the parity stored in the second memory;
    generating an error correction information signal in accordance with the syndrome when transmitting the output data from the second memory to the first memory; and
    temporarily storing the output data in the first memory.

11. The method as claimed in claim 10, wherein the second memory operates in a write mode in which the input data and the parity generated from the input data are stored as write data in the second memory, and operates in a read mode in which actual data from the write data excluding the parity is transmitted as the output data from the second memory.

12. The method as claimed in claim 10, further comprising selectively correcting and storing the output data stored in the first memory in response to the error correction information signal.

13. The method as claimed in claim 12, wherein correcting of the output data comprises performing a computing operation when a value of the syndrome indicates an error in the output data and replacing the output data with corrected data.

14. The method as claimed in claim 10, further comprising:
    receiving a request for access to the first memory from the second memory; and
    generating a signal in response to the request.

15. The method as claimed in claim 10, further comprising decoding the output data into multimedia data.

16. The method as claimed in claim 10, wherein the syndrome is computed using the Reed Solomon algorithm.

17. An article of manufacture having a machine-accessible medium including data that, when accessed by a machine, causes the machine to:

temporarily store the input data in a first memory;

transmit the input data from the first memory to a second memory;

generate a parity on-the-fly in the second memory;

store the parity in the second memory;

compute a syndrome on-the-fly based on the parity stored in the second memory;

generate an error correction information signal according to the syndrome when transmitting the output data from the second memory to the first memory; and temporarily store the output data in the first memory.

18. The article as claimed in claim 17, wherein the article further causes the machine to selectively correct and store the output data stored in the first memory in response to the error correction information signal.

19. The article as claimed in claim 18, wherein the machine selectively corrects the output data by performing a computing operation when a value of the syndrome indicates an error in the output data and replaces the output data with the corrected data.

20. The article as claimed in claim 1, wherein the syndrome is computed using the Reed Solomon algorithm.

* * * * *